UNITED STATES PATENT OFFICE.

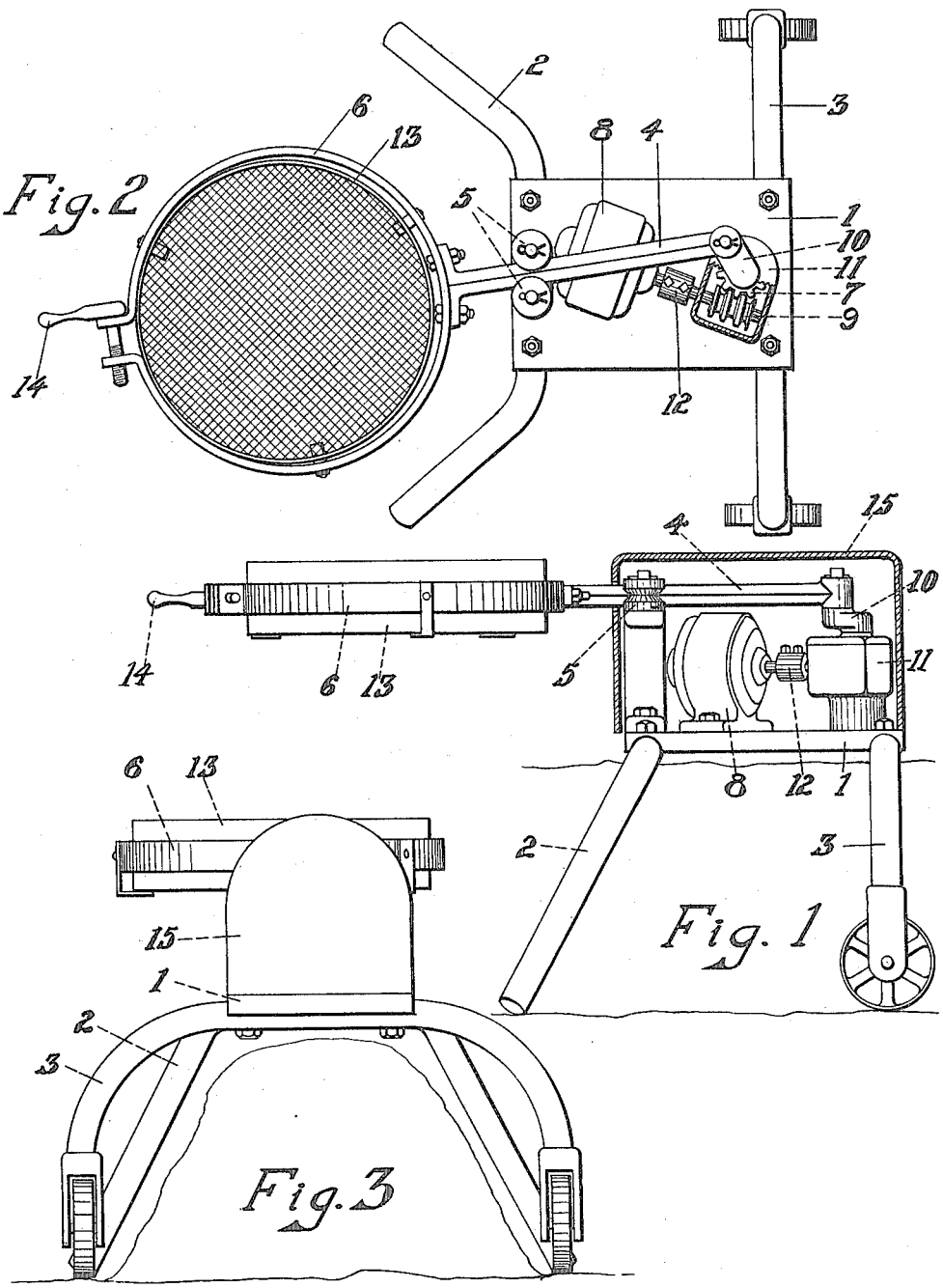

HENRY O. MAGNUSSON, OF CHICAGO, ILLINOIS.

SAND-SIFTING APPARATUS.

1,164,735.　　　　Specification of Letters Patent.　　Patented Dec. 21, 1915.

Application filed April 2, 1914. Serial No. 828,995.

*To all whom it may concern:*

Be it known that I, HENRY O. MAGNUSSON, a citizen of the United States, residing at Chicago, in the county of Cook and State of Illinois, have invented a certain new and useful Improvement in Sand-Sifting Apparatus, of which the following is a specification.

This invention relates to sand sifting apparatus and has for its object to provide a new and improved device of this description, particularly adapted for use in foundries.

The invention is illustrated in the accompanying drawings, wherein:

Figure 1 is a side elevation of a device embodying the invention; Fig. 2 is a plan view of the device shown in Fig. 1; Fig. 3 is a rear end view of the device illustrated in Figs. 1 and 2.

Like numerals refer to like parts throughout the several figures.

As illustrated in the drawings the device consists of a frame 1 having the front legs 2 and rear legs 3, the legs being arranged so as to straddle the sand pile. The rear legs 3 are preferably provided with rollers so that the device can be easily moved from place to place. The front legs may also be provided with rollers, but I prefer not to have rollers on these legs so that the device will stand in a steadier position. When it is desired to move it from place to place, the front legs may be lifted. Mounted on the frame 1 is an arm 4 having a pivoted or rocking connection with the frame and carrying the sieve or riddle holder 6. As herein shown, the arm has a sliding connection with the guiding device consisting of the guiding parts 5, said arm 4 having at this point a rocking connection with the frame 1.

A suitable means is provided for giving the sieve or riddle 13 connected with the riddle holder 6 a rotary movement in a substantially horizontal plane so as to agitate the sand or other material in the riddle and cause the portions of the proper size to pass therethrough. As herein shown, this result is secured by a suitable mechanism mounted on the frame 1. In the drawings this mechanism consists of a gear 7 rotatably mounted and driven from any desired source, such as the motor 8 also mounted on said frame. In the particular construction shown, the gear 7 is a worm gear and is driven by a worm 9 connected with the motor shaft. The gear 7 is connected with the end of the arm 4 so as to give it a rotary movement to rock it about the rocking connection 5, thus giving the sieve or riddle a similar rotary movement. Any suitable connection may be used. As herein shown, the gear is provided with a crank 10, which connects with the end of the arm 4. The speed at which the riddle or sieve is driven can be regulated to suit the conditions presented and may be varied by varying the speed of the motor or changing the ratio between the worm 9 and the gear 7.

In the construction shown, the worm 9 and the gear 7 are inclosed in a casing 11, the crank 10 connected with the gear 7 bridging through said casing and having its end connected with the arm 4. The riddle frame 6 may be constructed in any desired manner and as here shown the two parts thereof are connected together by a screw controlled by a handle 14 so that the parts may be tightened to hold the riddle 13 or to release the same.

It will be seen that by means of this apparatus the sieve or riddle is given a rotary motion which causes the sand or other material therein to be moved with relation to the riddle so as to cause the finer particles thereof to pass through the riddle. This apparatus produces a looser sand in less time, which is very important in making molds and is cheap and durable and easily transported from place to place.

I have described the apparatus in detail, but it is of course evident that the form, construction and arrangement of the parts may be varied without departing from the spirit of my invention.

It will be noted that in the construction herein shown the riddle is entirely free from obstructions of any kind, either above or below said riddle, thus permitting the free and unobstructed handling of the sand, both in placing it in the riddle and removing it from beneath the riddle.

It will further be noted that the movement of the riddle in this case is such that the position of the central axis of the riddle is varied; and it will also be noted that the point on the arm 4 about which it rocks, is varied as the arm is slid back and forth through the guiding devices.

I claim:

1. A sifting device comprising a frame, an arm mounted upon said frame in a substantially horizontal position and having a rocking and sliding connection with the frame, a riddle connected with the arm on one side of said rocking and sliding connection and a rotary driving device connected with said arm on the opposite side of said rocking and sliding connection.

2. A sifting device comprising a frame, an arm mounted thereon in a substantially horizontal position, a guiding device with which said arm is slidably and pivotally connected, a riddle connected with said arm on one side of said guiding device and a rotary driving device connected with said arm on the opposite side of said guiding device.

3. A sifting device comprising a riddle, an arm with which said riddle is connected, a frame upon which said arm is carried, said arm having a sliding pivotal connection and a rotary connection with said frame and a rotary driving device connected with said arm whereby the riddle is moved to change the position of its central axis.

4. A sifting device comprising a frame, a motor mounted thereon, a gear mounted on said frame and driven by said motor, a crank connected with said gear, an arm connected with said crank and having a sliding and rocking connection with said frame at a point intermediate the ends of the arm and a riddle connected with said arm.

5. A sifting device comprising a frame, an arm mounted upon said frame in a substantially horizontal position, said arm having a rocking and sliding connection with said frame, a riddle connected with said arm and a driving device also connected with said arm and adapted to simultaneously slide said arm and rock it from side to side.

6. A sifting device comprising a frame, an arm mounted upon said frame in a substantially horizontal position and projecting therefrom, said arm having a rocking and sliding connection with said frame, a driving device connected with one end of said arm and a riddle connected with said arm, whereby the point on said arm about which it rocks is varied.

7. A sifting device comprising a frame, an arm mounted on said frame in a substantially horizontal position, said arm having a rocking connection with said frame, a riddle support connected with one end of said arm, a crank connected with the other end of said arm, a worm gear connected with said crank, a worm engaging said worm gear and means for driving said worm.

In testimony whereof I affix my signature in the presence of two witnesses this 28th day of March, 1914.

HENRY O. MAGNUSSON.

Witnesses:
GENEVA HIRTH,
LAUREL M. DOREMUS.

Copies of this patent may be obtained for five cents each, by addressing the "Commissioner of Patents, Washington, D. C."